(12) United States Patent
Kamei et al.

(10) Patent No.: US 10,324,611 B2
(45) Date of Patent: Jun. 18, 2019

(54) COMPUTER-READABLE NON-TRANSITORY STORAGE MEDIUM HAVING STORED THEREIN INFORMATION PROCESSING PROGRAM, INFORMATION PROCESSING SYSTEM, INFORMATION PROCESSING METHOD, AND INFORMATION PROCESSING APPARATUS

(71) Applicant: NINTENDO CO., LTD., Kyoto (JP)

(72) Inventors: Ginga Kamei, Kyoto (JP); Masayuki Okada, Kyoto (JP); Ryutaro Takahashi, Kyoto (JP)

(73) Assignee: NINTENDO CO., LTD., Kyoto (JP)

(*) Notice: Subject to any disclaimer, the term of this patent is extended or adjusted under 35 U.S.C. 154(b) by 261 days.

(21) Appl. No.: 15/219,565

(22) Filed: Jul. 26, 2016

(65) Prior Publication Data

US 2017/0235455 A1 Aug. 17, 2017

(30) Foreign Application Priority Data

Feb. 12, 2016 (JP) .................................. 2016-025123

(51) Int. Cl.
*G06F 3/033* (2013.01)
*G06F 3/0485* (2013.01)
(Continued)

(52) U.S. Cl.
CPC ............ *G06F 3/0485* (2013.01); *G06F 3/033* (2013.01); *G06F 3/0488* (2013.01);
(Continued)

(58) Field of Classification Search
CPC .... G06F 3/0485; G06F 3/04815; G06F 3/033; G06F 3/04845; G06F 2203/04803; G06T 15/20
See application file for complete search history.

(56) References Cited

U.S. PATENT DOCUMENTS 8,548,778 B1 10/2013 Hart
8,763,004 B1 * 6/2014 Callahan, III .......... G06F 9/448
718/104
(Continued)

FOREIGN PATENT DOCUMENTS

JP 2010-262449 11/2010
JP 2011-258152 12/2011
(Continued)

OTHER PUBLICATIONS

Ben Patterson, "4 Ways To Take Charge Of iO's Background App Refresh Feature", published on Jan. 18, 2016 to https://www.macworld.com/article/3020539/apple-phone/4-ways-to-take-charge-of-ioss-background-app-refresh-feature.html, retrieved Jun. 11, 2018.*
(Continued)

*Primary Examiner* — Shourjo Dasgupta
(74) *Attorney, Agent, or Firm* — Nixon & Vanderhye P.C.

(57) ABSTRACT

A content display area that is an area where screen scroll is possible on the basis of an input performed with a pointing device and includes a three-dimensional image area for projecting a three-dimensional image and a two-dimensional image area for displaying a two-dimensional image, the two-dimensional image area being adjacent to the three-dimensional image area, is displayed on a screen. Then, when the content display area is scrolled on the screen, both the three-dimensional image area and the two-dimensional image area are scrolled on the screen together.

13 Claims, 16 Drawing Sheets

(51) Int. Cl.
*G06F 3/0481* (2013.01)
*G06F 3/0484* (2013.01)
*G06T 15/20* (2011.01)
*G06F 3/0488* (2013.01)

(52) U.S. Cl.
CPC ...... *G06F 3/04815* (2013.01); *G06F 3/04845* (2013.01); *G06T 15/20* (2013.01); *G06F 2203/04803* (2013.01)

(56) References Cited

U.S. PATENT DOCUMENTS

| | | | |
|---|---|---|---|
| 9,619,519 | B1* | 4/2017 | Dorner .............. G06F 17/30522 |
| 9,749,638 | B1* | 8/2017 | Jia ........................ H04N 19/136 |
| 2010/0058248 | A1* | 3/2010 | Park ....................... G06F 3/0481 715/851 |
| 2012/0001944 | A1 | 1/2012 | Sakurai et al. |
| 2012/0013562 | A1* | 1/2012 | Jyonoshita ............ G06F 3/0416 345/173 |
| 2012/0072863 | A1 | 3/2012 | Akifusa |
| 2012/0313976 | A1 | 12/2012 | Shirakawa |
| 2014/0289672 | A1 | 9/2014 | Uejima |
| 2015/0306500 | A1* | 10/2015 | Edsall ................. A63F 13/5258 463/31 |
| 2016/0062635 | A1* | 3/2016 | Feit ....................... G06F 3/0481 715/765 |
| 2016/0188181 | A1* | 6/2016 | Smith ..................... G06F 3/048 715/765 |

FOREIGN PATENT DOCUMENTS

| | | |
|---|---|---|
| JP | 2012-068726 | 4/2012 |
| JP | 2012-243038 | 12/2012 |
| JP | 2013-003687 | 1/2013 |
| JP | 2013-198589 | 10/2013 |
| JP | 2014-182531 | 9/2014 |
| JP | 2015-516193 | 6/2015 |
| JP | 2015-154165 | 8/2015 |
| JP | 5830153 | 10/2015 |
| WO | 2005/106628 | 11/2005 |

OTHER PUBLICATIONS

Trevor Dobrygoski, "Switchr Task Switcher: "Alt + Tab" For Your Android Phone", published on Nov. 3, 2013 to https://www.maketecheasier.com/switchr-task-switcher-android/, retrieved Jun. 11, 2018.*

Ciprian Adrian Rusen, "Windows Phone: How To Switch Between Apps Like With Alt-Tab In Windows", published on Nov. 13, 2015 to https://www.digitalcitizen.life/windows-phone-how-switch-between-apps-alt-tab-windows, retrieved Jun. 11, 2018.*

Fotis Liarokapis, "Interactive Virtual and Augmented Reality Environments", Mar. 2015, Faculty of Informatics, Masaryk University, Czech Republic, retrieved from https://www.fi.muni.cz/~liarokap/publications/docent.pdf, retrieved Mar. 26, 2019 (Year: 2015).*

"Building the Star Wars Scroll Text in Unity", Dec. 30, 2015, retrieved from https://livierickson.com/blog/building-the-star-wars-scroll-text-in-unity/, retrieved Mar. 26, 2019 (Year: 2015).*

* cited by examiner

Fig. 18
SCREEN OF "FRIEND"
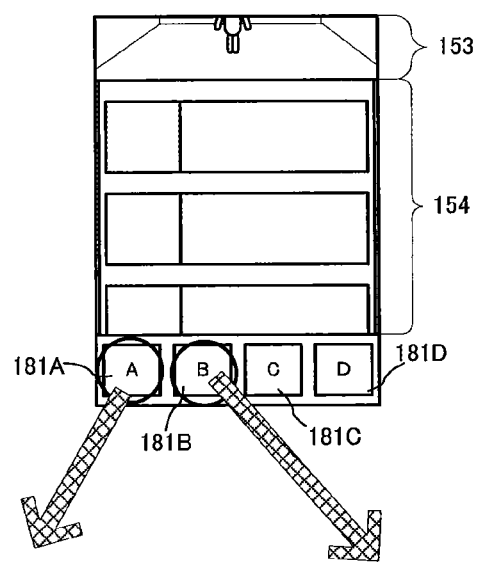
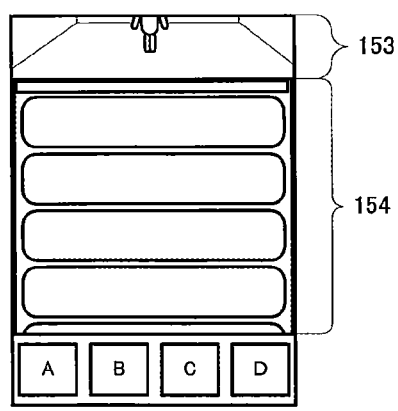
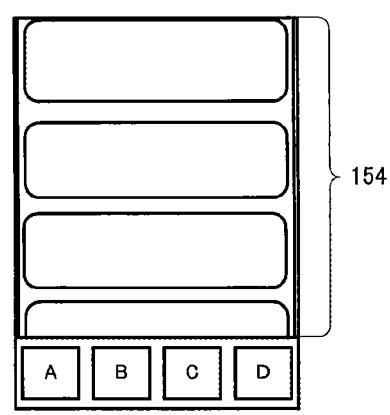
SCREEN OF "NEW ARRIVAL"      SCREEN OF "MY ANSWER"

COMPUTER-READABLE NON-TRANSITORY STORAGE MEDIUM HAVING STORED THEREIN INFORMATION PROCESSING PROGRAM, INFORMATION PROCESSING SYSTEM, INFORMATION PROCESSING METHOD, AND INFORMATION PROCESSING APPARATUS

CROSS REFERENCE TO RELATED APPLICATION

The disclosure of Japanese Patent Application No. 2016-025123, filed on Feb. 12, 2016, is incorporated herein by reference.

FIELD

The exemplary embodiments relate to a computer-readable non-transitory storage medium having stored therein an information processing program executed by a computer of an information processing apparatus capable of receiving an input performed with a pointing device, and more particularly relate to screen display control performed when a virtual three-dimensional space image and a two-dimensional image are displayed on a single screen.

BACKGROUND AND SUMMARY

Hitherto, a technique to scroll a two-dimensional image displayed on a screen in accordance with an operation on a touch panel is known.

The above technique assumes the case where an image displayed on the screen is a two-dimensional image. Thus, the technique does not particularly assume the case where a virtual three-dimensional space image obtained by capturing a virtual three-dimensional space with a virtual camera is displayed on the screen. In addition, the technique does not assume the case where a two-dimensional image and a virtual three-dimensional space image are simultaneously displayed on the single screen.

Therefore, it is an object of the exemplary embodiments to provide a computer-readable non-transitory storage medium having an information processing program stored therein, and the like, which enable screen scroll control that enhances convenience of a user, in the case of displaying a virtual three-dimensional space image and a two-dimensional image on a single screen in a smart device or the like.

In order to attain the object described above, the following configuration examples are exemplified.

A configuration example is directed to a computer-readable non-transitory storage medium having stored therein an information processing program executed by a computer of an information processing apparatus capable of receiving an input performed with a pointing device, the information processing program causing the computer to execute: positioning an object in a virtual three-dimensional space; positioning a virtual camera in the virtual three-dimensional space; generating a three-dimensional image by capturing the virtual three-dimensional space with the virtual camera; generating a predetermined two-dimensional image; displaying, on a screen, a content display area including a three-dimensional image area for projecting the three-dimensional image and a two-dimensional image area for displaying the two-dimensional image, the two-dimensional image area being adjacent to the three-dimensional image area; and performing screen scroll on the basis of an input performed with the pointing device. When the content display area is scrolled on the screen, both the three-dimensional image area and the two-dimensional image area are scrolled on the screen together.

According to the above configuration example, the limited size of the screen can be effectively used in accordance with the degree of interest of a user in each of the three-dimensional image area and the two-dimensional image area, so that the convenience of the user can be enhanced.

In another configuration example, the information processing program may further cause the computer to execute determining whether an input has been performed with the pointing device with respect to the three-dimensional image area or the two-dimensional image area. When a predetermined operation having a starting point of an input at a position within the two-dimensional image area has been performed, the content display area may be scrolled on the screen. Further, the information processing program may further cause the computer to execute controlling the virtual three-dimensional space without scrolling the content display area on the screen when a predetermined operation having a starting point of an input at a position within the two-dimensional image area has been performed.

According to the above configuration example, the content area can be scrolled on the screen, for example, by a swipe operation having a starting point at a position within the two-dimensional image area. In addition, in the case of a swipe operation having a starting point at a position within the three-dimensional image area, control of the virtual three-dimensional space can be performed. Accordingly, intuitive operability can be provided.

In another configuration example, the information processing program may further cause the computer to execute enlarging a size of the three-dimensional image area when a first operation has been performed with respect to the three-dimensional image area with the pointing device. In addition, an angle of view of the virtual camera may be changed on the basis of an aspect ratio of the three-dimensional image area after the enlargement of the size of the three-dimensional image area. Moreover, the information processing program may further cause the computer to execute performing control of moving the virtual camera in accordance with a content of a second operation different from the first operation when the second operation has been performed with respect to the three-dimensional image area with the pointing device.

According to the above configuration example, intuitive operability with respect to the virtual three-dimensional space can be provided. In addition, for example, the three-dimensional space image can be maximized and displayed by a tap operation with respect to the three-dimensional image area, so that the operability with respect to the virtual three-dimensional space may be further enhanced. Moreover, when the maximization display is performed, a virtual three-dimensional space image that causes no feeling of discomfort can be provided.

In another configuration example, the information processing program may further cause the computer to execute updating a content displayed in the two-dimensional image area, in accordance with a predetermined operation performed with the pointing device. The three-dimensional image projected to the three-dimensional image area may be updated at a predetermined time interval regardless of presence/absence of the predetermined operation performed with the pointing device.

According to the above configuration example, for example, whereas a process having a high real-time property, such as notification of new arrival data, is realized as a process using a virtual three-dimensional space, a process having low necessity of being performed in real time can be executed as a process using a two-dimensional image. Furthermore, regarding the process using the two-dimensional image, the content displayed on the screen can be updated at any timing in accordance with an operation of the user, so that the convenience of the user can be enhanced.

In another configuration example, the three-dimensional image area may be positioned in the content display area and at a position corresponding to a head of scroll when the screen scroll is performed. In addition, the three-dimensional image area and the two-dimensional image may be positioned such that a direction in which the three-dimensional image area and the two-dimensional image are adjacent to each other is parallel to a direction of the screen scroll.

According to the above configuration example, for example, as a screen displayed in the initial state, both the three-dimensional space image and the two-dimensional image can be displayed within the single screen. In addition, when the user desires to display the three-dimensional image area, the three-dimensional image area can be included in the screen by merely performing scroll to the head, so that an intuitive operation can be provided.

In another configuration example, the information processing program may further cause the computer to execute controlling the virtual three-dimensional space regardless of whether an operation for the screen scroll is being performed. In addition, the three-dimensional image projected to the three-dimensional image area may be updated even when the three-dimensional image area is not displayed on the screen.

According to the above configuration example, the state in the virtual three-dimensional space can be continuously updated regardless of presence/absence of an operation of the user. Therefore, processes can be selectively performed such that, whereas a process having a high real-time property, such as notification of new arrival data, is realized as a process using a virtual three-dimensional space, a process having low necessity of being performed in real time can be executed as a process using a two-dimensional image.

In another configuration example, the content may include a plurality of contents, and the information processing program may further cause the computer to execute switching display of the plurality of contents in accordance with an input performed with the pointing device. Only a displayed content in the two-dimensional image area may be changed in accordance with a content switching operation, further when switching of a content occurs, information indicating a display range of the content display area on the screen immediately before the switching may be stored, and then when switching to the content is performed in a state where another content is displayed, the display may be switched so as to reproduce the stored display range. Moreover, when the switching of the content occurs, it may be determined whether at least a part of the three-dimensional image area is included in a display screen immediately before the switching. When switching from a first content to a second content occurs, if the three-dimensional image area is included both in a display range, on the screen, of the content display area regarding the first content and in a final display range of the content display area regarding the second content, a display range of the content display area regarding the second content may be adjusted and the switching may be performed, such that a displayed position of the three-dimensional image area regarding the first content before the switching is reflected as a displayed position of the three-dimensional image area regarding the second content after the switching.

According to the above configuration example, when display of a plurality of contents is switched and used, it is possible to enhance the convenience of the user.

According to the present embodiment, when the three-dimensional image area and the two-dimensional image area are displayed on the single screen, the convenience of the user can be enhanced while the limited size of the screen is effectively used.

BRIEF DESCRIPTION OF THE DRAWINGS

FIG. 18 is a diagram for explaining the operation performed at the time of content switching;

DETAILED DESCRIPTION OF NON-LIMITING EXAMPLE EMBODIMENTS

Hereinafter, an exemplary embodiment will be described.

Figure 1:
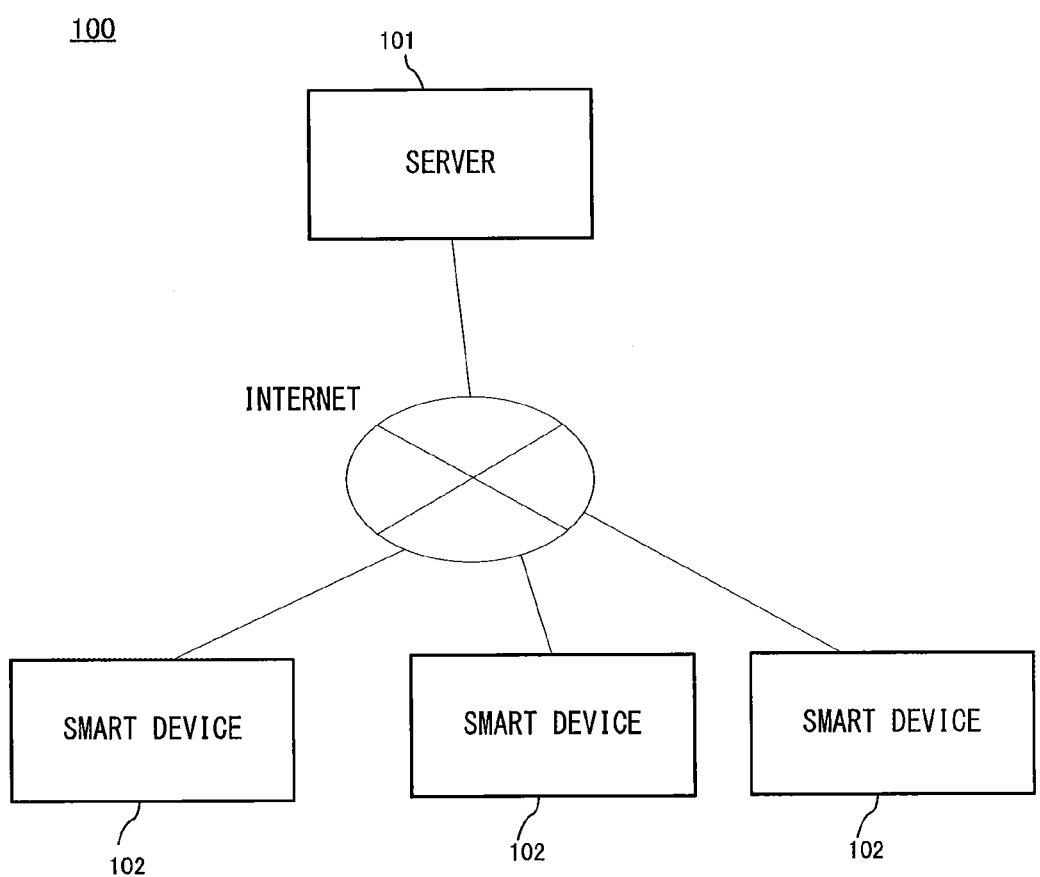
FIG. 1 is a schematic diagram showing the whole image of an information processing system that is a non-limiting example of an exemplary embodiment.

FIG. 1 is a schematic diagram showing the whole image of an information processing system according to the present embodiment. The information processing system 100 according to the present embodiment includes a server 101 and a plurality of portable smart devices (hereinafter, referred to merely as smart devices) 102. Each smart device 102 is, for example, a smartphone, a tablet device, or the like. The server 101 and each smart device 102 are configured to be able to communicate with each other via the Internet. The present embodiment assumes that a communication service between the smart devices 102 is provided with such a configuration. In each smart device 102, an application for achieving the communication service is installed. Then, the communication service is provided to a user by transmitting and receiving predetermined data to and from another smart device 102 via the server 101.

Figure 2:
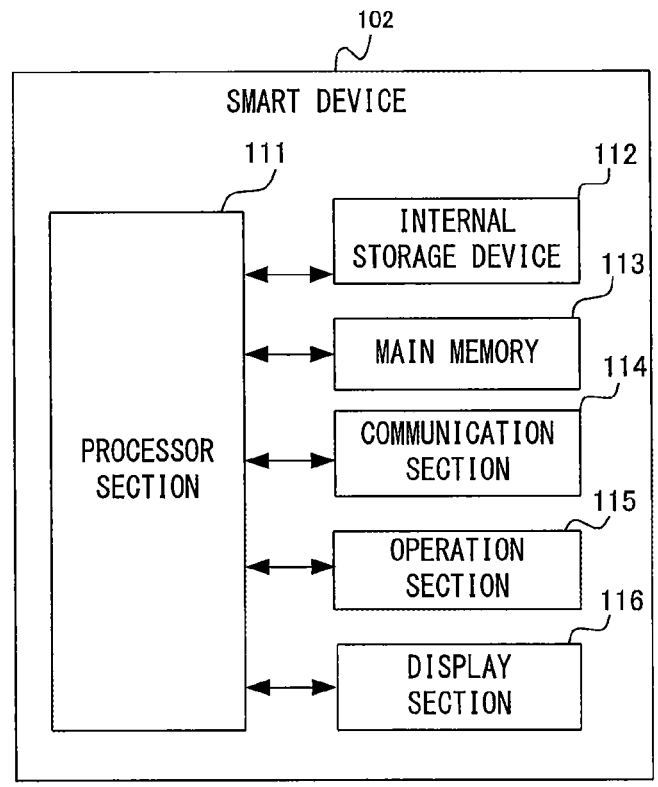
FIG. 2 is a block diagram showing a non-limiting example of the configuration of each smart device 102.

Next, the configuration of each hardware in the above system will be described. FIG. 2 is a functional block diagram of each smart device 102. In FIG. 2, the smart device 102 includes a processor section 111, an internal storage device 112, a main memory 113, a communication section 114, an operation section 115, and a display section 116. The processor section 111 executes later-described information processing and executes a system program (not shown) for controlling overall operation of the smart device 102, thereby controlling operation of the smart device 102. The processor section 111 may include a single processor or a plurality of processors. The internal storage device 112 stores therein various programs to be executed by the processor section 111, and various kinds of data to be used in the programs. The internal storage device 112 is, for example, a flash EEPROM or a hard disk device. The main memory 113 temporarily stores therein computer programs and information. The communication section 114 connects to a network by a wired or wireless communication, and transmits and receives data to and from the server 101. The operation section 115 is, for example, an input device for receiving an operation from a user. The display section 116 is typically a liquid crystal display unit. In processing according to the present embodiment, a touch panel integrated with a liquid crystal screen is assumed as the operation section 115 and the display section 116. In another embodiment, a predetermined pointing device other than a touch panel may be used as the operation section 115.

Figure 3:
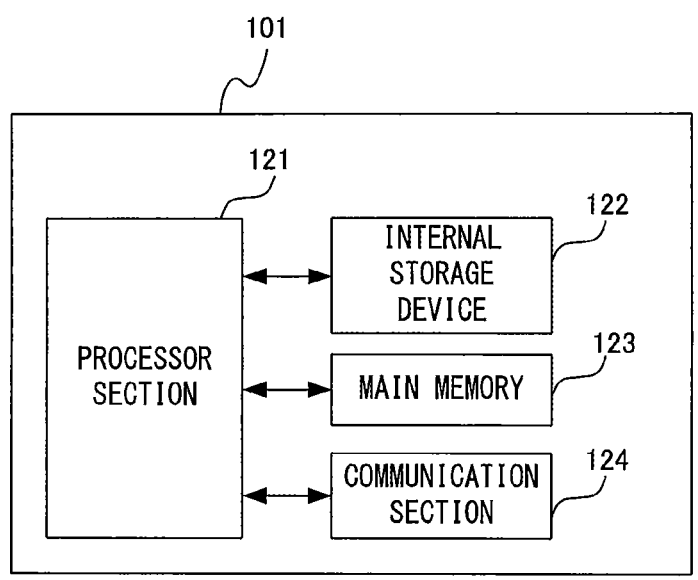
FIG. 3 is a block diagram showing a non-limiting example of the configuration of a server 101.

Next, the configuration of the server 101 will be described. FIG. 3 is a functional block diagram of the server 101. The server 101 includes at least a processor section 121, an internal storage device 122, a main memory 123, and a communication section 124. The processor section 121 executes various programs for controlling the server 101. In the internal storage device 122, the various programs to be executed by the processor section 121, and various data to be used by the processor section 121 are stored. The main memory 123 temporarily stores a computer program and information. The communication section 124 connects to a network by a wired or wireless communication, and transmits and receives predetermined data to and from the smart devices 102 or another server (not shown).

Next, an operation outline of information processing according to the present embodiment will be described. The processing described in the present embodiment relates to mainly screen display control in the smart device 102. First, an operation outline of an application (the above communication service) assumed in the present embodiment will be described.

The application assumed in the present embodiment performs communication with another user by using a so-called avatar. Specifically, a predetermined question is given from the application side to an own avatar. In response to the question, the user inputs their reply. The reply content is transmitted to, for example, another user who has been registered as a friend. In addition, a reply content transmitted from another user is also received. Then, in the application, a predetermined screen based on the received reply content is generated and displayed on a screen. For example, it is assumed that, in response to a question "What's your favorite drink?", a friend inputs "coffee" as a reply. The reply content is received, and, for example, a text message, "What's your favorite drink?" and "coffee", is displayed. That is, a reply content to a predetermined question is transmitted and received between users (smart devices). Moreover, for example, by using the above avatar, it is possible to perform representation in which an avatar of a friend visits the user and speaks a message based on a reply content as described above. For example, representation is also possible in which the visiting avatar speaks "I like coffee".

Figure 4:
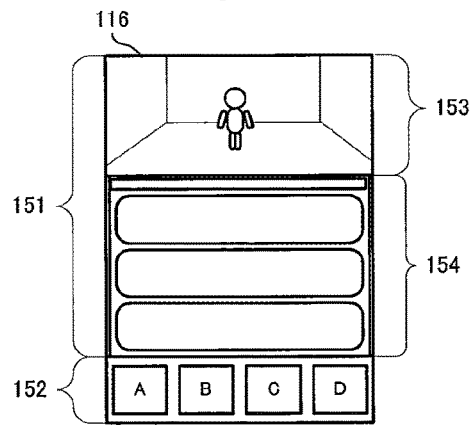
FIG. 4 is a non-limiting example of an application screen according to the exemplary embodiment.

Next, an operation of the application according to the present embodiment will be described by using a screen example of the application. FIG. 4 is an example of an application screen displayed on the display section 116. In the present embodiment, the application screen is displayed as a so-called "vertical screen". The application screen includes a content area 151 and a menu area 152.

Figure 5:
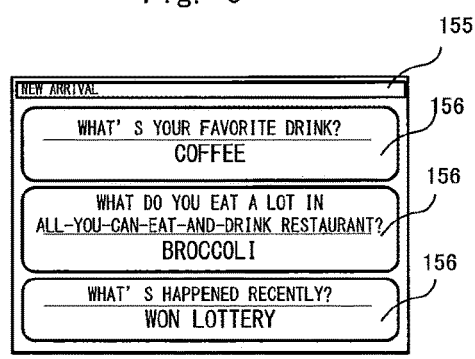
FIG. 5 is a non-limiting more specific display example of a 2D content area 154.

First, the content area 151 will be described. The content area 151 includes a 3D content area 153 and a 2D content area 154. The 3D content area 153 and the 2D content area 154 are positioned adjacent to each other. In addition, the direction in which the 3D content area 153 and the 2D content area 154 are adjacent to each other is a direction parallel to a screen scroll direction. The 3D content area 153 is an area for projecting an image obtained by capturing a virtual three-dimensional space with a virtual camera. That is, the 3D content area 153 is an area for displaying a virtual three-dimensional space image. In the present embodiment, a 3D model of the above avatar (an avatar object) is displayed in the 3D content area 153. Next, the 2D content area 154 is an area for displaying a two-dimensional image. In the present embodiment, a two-dimensional image generated on the basis of data (data of the above reply content, etc.) received from the server 101 is mainly displayed in the 2D content area 154. For example, a text based on a reply content of a friend is displayed in the 2D content area 154. FIG. 5 shows a more specific display example of the 2D content area 154. In FIG. 5, a horizontally long title bar 155 is displayed at the upper edge of the 2D content area 154. Three panels 156 are displayed below the title bar 155 so as to be aligned in the vertical direction. In each panel 156, an image/text based on a reply content of one person is shown. For example, a face image of an avatar, a question sentence, and a reply content to the question are displayed. In the example of FIG. 5, reply contents of three persons are displayed simultaneously. In other words, it can be said that a list including a plurality of items (panels 156) is displayed in the 2D content area 154.

Figure 6:
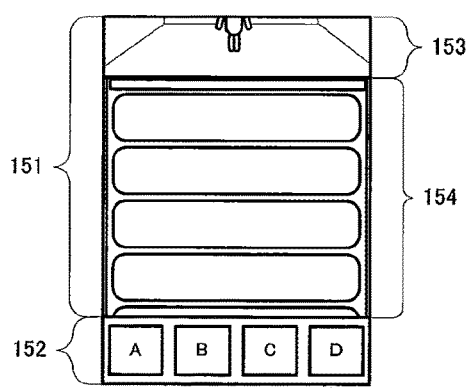
FIG. 6 is a non-limiting example of the application screen according the exemplary embodiment.

Meanwhile, in the present embodiment, in the case of further viewing a reply content of another friend, the reply content of the other friend can be further displayed on the screen by scrolling the screen in the vertical direction. Here, when a virtual three-dimensional space image is displayed at an upper portion of the screen and a two-dimensional image is displayed on the screen and below the virtual three-dimensional space image as in FIG. 4 described above, it is conceivable that a slide operation in the vertical direction is performed on the touch panel in the case of scrolling the two-dimensional image portion. When such an operation is performed, control is generally performed in which only the 2D content area 154 portion in FIG. 4 is scrolled in the vertical direction, the 3D content area 153 is not scrolled, and the displayed position of the 3D content area 153 is fixed. However, in the present embodiment, when such a scroll operation is performed, control is performed in which the entire content area 151 is scrolled. That is, as shown in FIG. 6, the 3D content area 153 and the 2D content area 154 are simultaneously scrolled in the vertical direction (note that the menu area 152 described later is not an object to be subjected to scroll control, and is fixedly displayed). In other words, the 3D content area 153 and the 2D content area 154 are scrolled together. This is performed from the viewpoint that, when such a scroll operation is performed, interest of the user is drawn to the 2D content area 154 rather than the 3D content area 153. In particular, in a communication tool assumed in the present embodiment, it is conceivable that communication with another user is displayed in the 2D content area 154 in many cases. For example, when a scroll operation in the screen downward direction is performed, it is conceivable that interest in viewing communication with the other user is great. Thus, for making effective use of the limited size of the screen, more contents in the 2D content area 154 are displayed on the screen. Therefore, as a result of continuing the scroll operation in the downward direction as described above, a state is obtained in which the 3D content area 153 is not displayed on the screen. In addition, when a scroll operation in the upward direction (opposite direction) is performed in this state, the screen shifts through the screen as shown in FIG. 6 and finally returns to the screen as shown in FIG. 4 described above. That is, it is possible to scroll the entire content area 151, and it can also be said that the 3D content area 153 is positioned at the position of the upper edge of the scroll.

Figure 7:
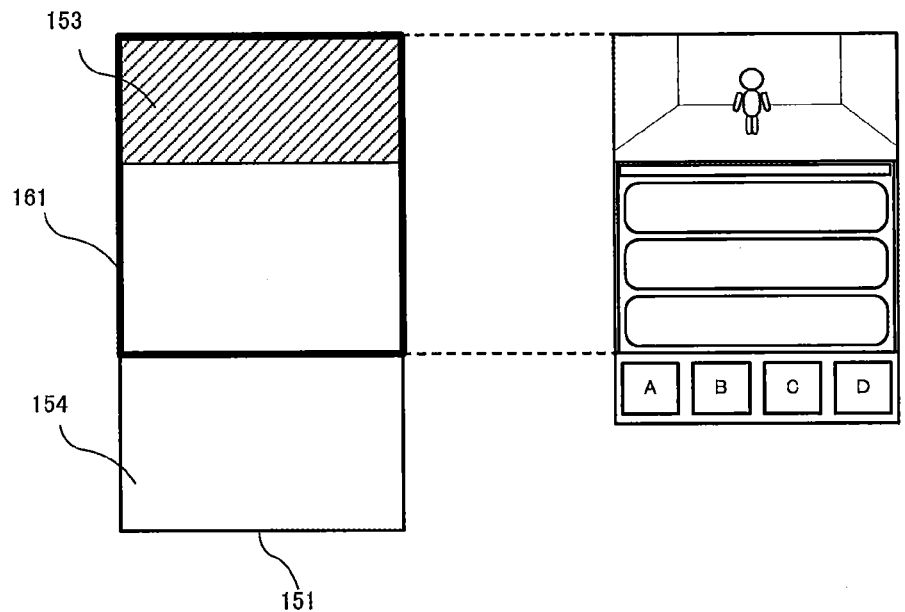
FIG. 7 is a diagram for explaining a concept of scroll control according to the exemplary embodiment.
Figure 8:
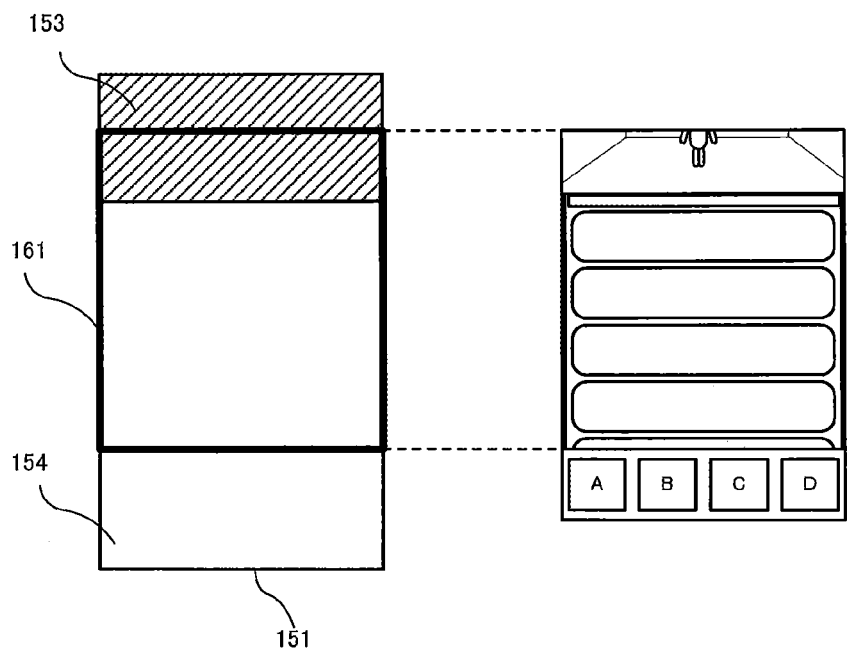
FIG. 8 a diagram for explaining the concept of the scroll control according to the exemplary embodiment.

A supplemental description of a concept of scroll control according to the present embodiment will be given with reference to the drawings. FIGS. 7 and 8 are diagrams showing a relationship between the content area 151 and a display target range 161 that is actually displayed on the screen. In FIGS. 7 and 8, the display target range 161 is shown by a thick line. In addition, the 3D content area 153 is shown by oblique lines. The content area 151 has a size larger than the display range of the screen internally in the information processing. In the present embodiment, as contents to be displayed in the 2D content area 154, data of 30 cases are acquired from the server 101 at one time. At predetermined timing, data of 30 cases are acquired from the server 101, and an image based on the data is added to a lower portion of the 2D content area 154 as appropriate.

A state shown in FIG. 7 indicates a state where the entire 3D content area 153 is included in the display target range 161 (e.g., an initial state after start of the application is such a state). When the user performs an operation for slightly scrolling the screen in this state, a state shown in FIG. 8 is obtained. That is, this is an image in which the entire content area 151 moves upward.

Figure 9:
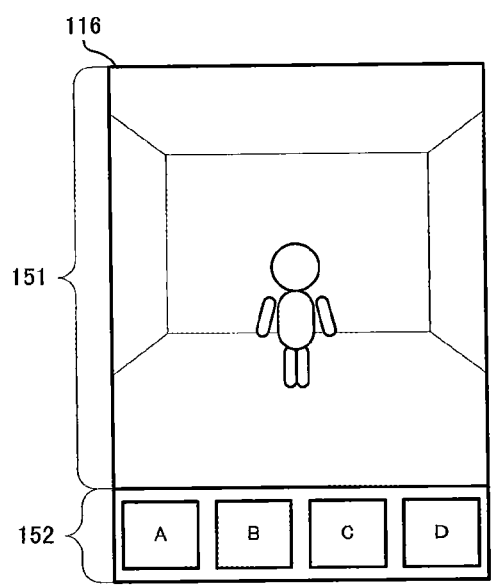
FIG. 9 is a non-limiting example of the application screen according to the embodiment.

Next, operations in the content area 151 other than the above scroll operation will be briefly described. First, a touch input operation with respect to the 3D content area 153 will be described. When a swipe operation is performed on the 3D content area 153, the position and the attitude of the virtual camera are controlled in accordance with the swipe direction and the swipe amount (distance) of this operation. In the present embodiment, the virtual camera has a fixation point at the avatar of the user and moves around the avatar. That is, rotational movement of the virtual camera is made. In addition, when a tap operation is performed on a specific object displayed in the 3D content area 153, a predetermined process related to the object is executed. For example, a "balloon" including a face image of a friend avatar is displayed near the avatar of the user. The balloon indicates that there is a new arrival reply content that has not been read (confirmed) (that is, new arrival message notification). Then, when the user taps the balloon, a process is executed in which the friend avatar appears in the virtual space (representation is performed in which the friend avatar visits a room) and a message based on the new arrival replay content is displayed. In addition, when the user taps a position other than the specific object, the 3D content area 153 is maximized and displayed as shown in FIG. 9. That is, the 3D content area 153 is enlarged in size and displayed to such a degree that the 2D content area 154 is no longer displayed in the screen. This makes it possible to easily perform various operations with respect to the virtual three-dimensional space. In another embodiment, the size of the 3D content area 153 may be enlarged, but may not be enlarged to such a degree that the 2D content area 154 is no longer displayed (the 3D content area 153 is merely enlarged, rather than being maximized and displayed). That is, the size of the 3D content area 153 may be enlarged to such a degree that the 2D content area 154 still remains displayed in the screen, although the 2D content area 154 becomes narrow.

Here, regarding the operation with respect to the 3D content area 153, in other words, it can be said that a scroll operation for the content area 151 can occur only when the starting point of a touch input is in the 2D content area 154. That is, when the starting point of the input of a swipe operation is in the 3D content area 153, the above virtual camera control is performed.

Figure 10:
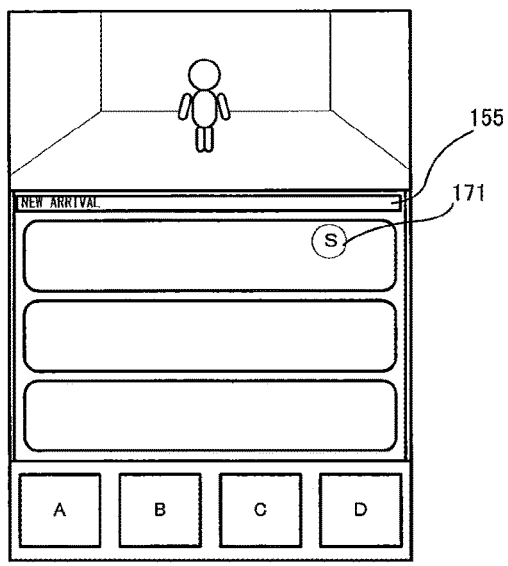
FIG. 10 is a diagram for explaining a refresh operation.
Figure 11:
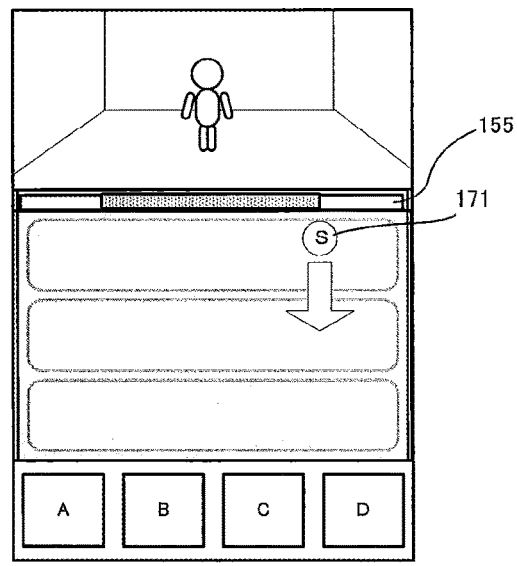
FIG. 11 is a diagram for explaining the refresh operation.
Figure 12:
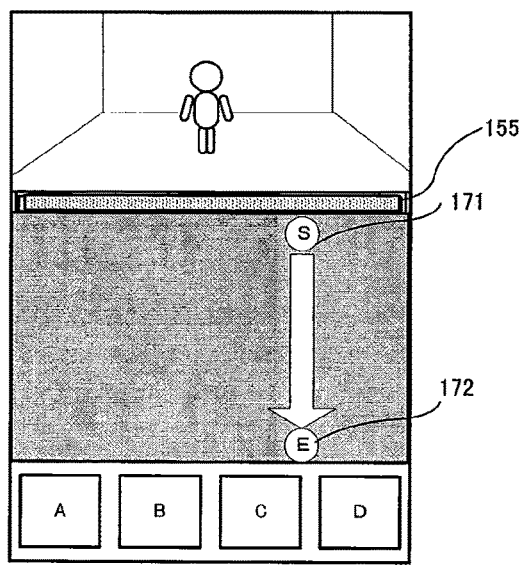
FIG. 12 is a diagram for explaining the refresh operation.
Figure 13:
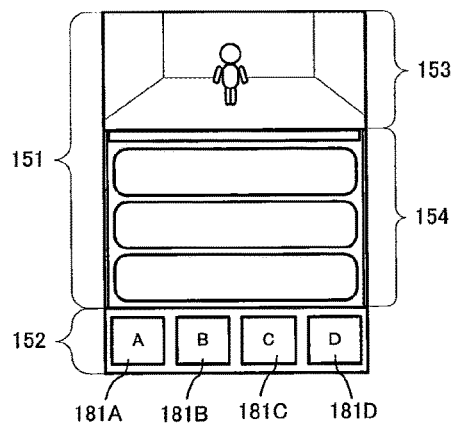
FIG. 13 is a diagram for explaining an operation performed at the time of content switching.

Next, touch input operations with respect to the 2D content area 154 other than the above scroll operation will be described. In the case of a tap operation, a predetermined process corresponding to an image at the tap position at which the tap operation is performed is executed. In addition, in the present embodiment, there is a "refresh operation" for updating the content in the 2D content area 154. This operation is an operation in which a swipe operation in the downward direction is performed on the 2D content area 154 in a state where upward scroll cannot be performed anymore (a state where the entire 3D content area 153 is displayed in the screen). By this operation, a communication process of acquiring latest data is performed on the server 101. In accordance with the result, the displayed content in the 2D content area 154 is updated. Screen control performed when this operation is performed will be described with reference to FIGS. 10 to 12. First, it is assumed that the user performs touch-on at a point 171 in a state of FIG. 10. The position of the point 171 is near the upper edge of the 2D content area 154 and slightly above the center of the entire screen. It is assumed that with the point 171 as a starting point, a swipe operation is performed downward as shown in FIG. 11, finally to the position of a point 172 shown in FIG. 12. In accordance with the distance of the swipe operation, of the 2D content area 154, a portion other than the title bar 155 is displayed so as to be gradually grayed out. In addition, during this operation, the displayed content in the title bar 155 also changes. For example, after the touch-on is performed at the point 171, when the distance of the swipe operation becomes equal to or larger than a predetermined value, the displayed content in the title bar 155 is changed. In the example of FIGS. 11 and 12, a gauge that is extended horizontally from the center of the title bar 155 in accordance with the distance of the swipe operation is displayed. During the swipe operation, a text or the like that is an operation guide may be displayed on the title bar 155 (e.g., "Update when dragged downward" etc.). Then, after the swipe operation is performed to the point 172 (at this time, the displayed text in the title bar 155 may be changed to "Update when separating finger"), when the user performs touch-off, the grayed-out display is cancelled, and the displayed content in the 2D content area 154 is updated. That is, at the time when the touch-off is detected, a data request to the server 101 is made, and data corresponding to the request (data to be displayed in the 2D content area 154 in this example) is downloaded. Then, the displayed content in the 2D content area 154 is updated on the basis of the downloaded data. As a color used in the grayed-out display, any color may be used. For example, in another embodiment, white may be used (white out), or black may be used (black out).

Next, the menu area 152 will be described. In the application according to the present embodiment, roughly, four contents are prepared. Then, buttons for switching the four contents are displayed as four menu buttons 181A to 181D in the menu area 152. As an example of the four contents, in the present embodiment, "new arrival", "my answer", "friend", and "shop" are prepared. By tapping the menu button 181 corresponding to each content, the user can switch a content to be displayed on the screen. In the present embodiment, the displayed content in the 2D content area 154 is changed by this switching, and the displayed content in the 3D content area 153 is not changed on the basis of this switching. That is, even in the case of displaying any of the contents, an image obtained by capturing the same virtual three-dimensional space is displayed in the 3D content area 153 (the virtual three-dimensional space is shared among the contents). In other words, the virtual three-dimensional space is not linked directly to the above content switching.

Here, an outline of each content will be briefly supplemented. The "new arrival" is a content mainly for viewing a reply content of a friend. Thus, an image or the like based on a reply content of a friend is mainly displayed in the 2D content area 154. In the present embodiment, an "already-read" reply content is displayed in the 2D content area 154. An "unread" reply content is notified the user of, for example, in the form of a balloon of an avatar as described above. By the user tapping the balloon, the reply content is handled as being "already-read", and is added and displayed in the 2D content area 154 as appropriate.

The "my answer" is a content mainly for viewing a history of contents replied by the user themselves (questions and reply contents to the questions). In the 2D content area 154, an image, a text, etc. based on a reply content of the user themselves are mainly displayed. The "friend" is a content mainly for managing friends, and the 2D content area 154 is used for providing a user interface for managing friends. The "shop" is a content for buying, for example, parts for dressing up avatars, etc. In the 2D content area 154, link images to various shops are displayed. In addition, a screen corresponding to each shop is displayed as appropriate in accordance with a tap on the link image, and a user interface for buying parts is provided.

Next, an example of screen control performed at the time of content switching as described above will be described with reference to FIGS. 13 to 18. Hereinafter, the "new arrival" corresponds to the menu button 181A, the "my answer" corresponds to the menu button 181B, the "friend" corresponds to the menu button 181 C, and the "shop" corresponds to the menu button 181D.

First, as an initial state, a state where the "new arrival" content is displayed is assumed. In this state, when the menu button 181A is tapped, the content area 151 is automatically scrolled to the uppermost portion thereof. That is, when the menu button 181 for the content that is the same as the currently displayed content is tapped, automatic screen scroll is executed such that the upper edge of the content area 151 is displayed on the screen. On the other hand, when the menu button 181 for the content that is different from the currently displayed content is tapped, the content corresponding to the tapped menu button 181 is displayed in the content area 151.

Figure 14:
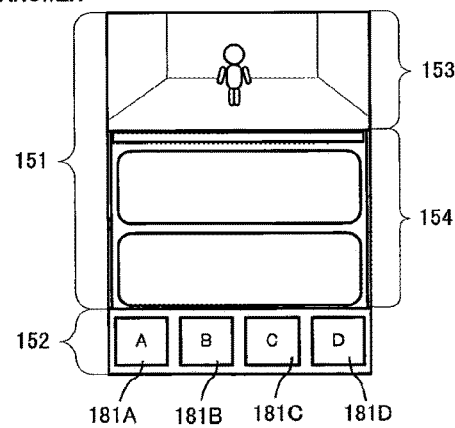
FIG. 14 is a diagram for explaining the operation performed at the time of content switching.
Figure 15:
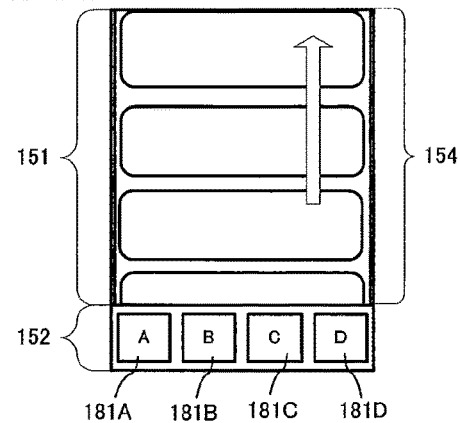
FIG. 15 is a diagram for explaining the operation performed at the time of content switching.
Figure 16:
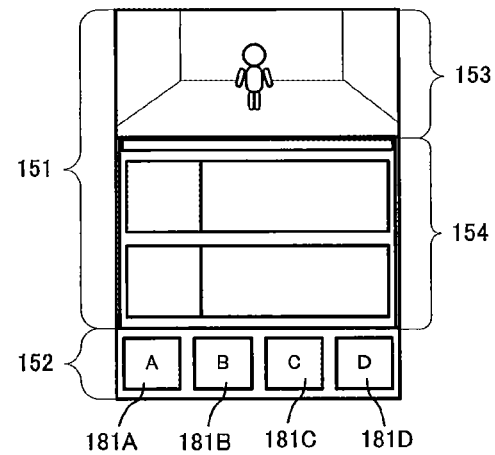
FIG. 16 is a diagram for explaining the operation performed at the time of content switching.
Figure 17:
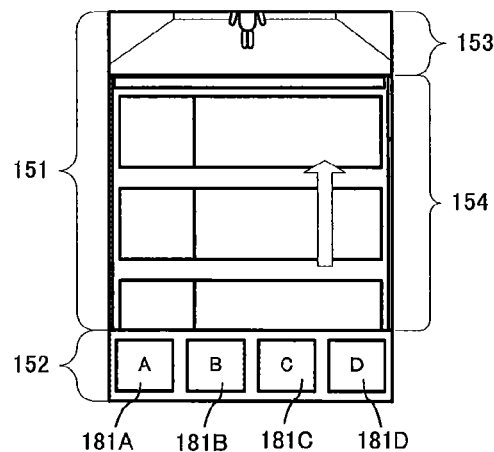
FIG. 17 is a diagram for explaining the operation performed at the time of content switching.

Here, in switching to a different content, in the present embodiment, the following screen control is performed. First, it is assumed that the following operation is performed as an example of an operation. In a state where the "new arrival" content is displayed (FIG. 13, a state where the entire 3D content area 153 is displayed), by the menu button 181B being tapped, the "my answer" content is displayed (FIG. 14). In this screen, it is assumed that a scroll operation is performed until the 3D content area 153 is no longer displayed on the screen (FIG. 15). Thereafter, by the menu button 181C being tapped, the "friend" content is displayed (FIG. 16). In this screen, a scroll operation is performed to such a degree that substantially the upper half of the 3D content area 153 is not displayed on the screen (FIG. 17). That is, the current state is a state where a part of the 3D content area 153 remains in the display range. The case of switching to the "new arrival" content and the case of switching to the "my answer" content in a state where such operations have been performed are considered. First, when switching to the "new arrival" content is performed by tapping the menu button 181A in the state of FIG. 17, control is performed such that the displayed position of the 3D content area 153 is not changed and only the content in the 2D content area 154 is switched to the content in the "new arrival" content as shown in FIG. 18. On the other hand, when switching to the "my answer" content is performed by tapping the menu button 181B in the state of FIG. 17, a screen in a final display state of the "my answer" content, that is, in a state where the 3D content area 153 is not included in the screen, is displayed. That is, when switching from a certain content to another content occurs, if the 3D content area 153 is not included and only the 2D content area is displayed in the final screen, the display state of the final screen is restored when subsequently returning from the other content. On the other hand, if at least a part of the 3D content area 153 is included in the final screen at the time of the content switching, the latest displayed position of the 3D content area 153 is reflected when returning from the other content. In the above example of the drawings, when the content is switched from the "new arrival" content to the "my answer" content, the entire 3D content area 153 is displayed on the screen. Thereafter, when the content returns to the "new arrival" content from the state of FIG. 17, although the entire 3D content area 153 is displayed when the content is switched from the "new arrival" content to the "my answer" content, the content area 151 is displayed such that the displayed position of the 3D content area 153 with respect to the "friend" content (the latest displayed position of the 3D content area 153) is reflected (therefore, a state is obtained in which the 3D content area 153 is slightly scrolled). As described above, in the present embodiment, in the case where switching to a content is performed in a state where the 3D content area 153 is included in the display range, the latest displayed position of the 3D content area 153 is reflected when switching to this content is performed thereafter. On the other hand, in the case where switching to another content is performed in a state where only the 2D content area 154 is displayed on the screen, when switching from the other content to this content is performed, the state where only the 2D content area 154 is displayed on the screen is restored and displayed, regardless of whether the 3D content area 153 is finally displayed with the other content. This is performed from the following standpoint. In the state where only the 2D content area 154 is displayed on the screen, it can be said that there is a high possibility that interest of the user is drawn to the displayed content in the 2D content area 154. In addition, it can also be said that interest of the user is drawn to the displayed content in the 2D content area at a specific position. Therefore, from such a viewpoint, a display state (displayed position/displayed content) in which interest of the user is great is restored, thereby enhancing the convenience of the user.

In the case where the 3D content area 153 is maximized and displayed, a tap operation on any menu button 181 is an operation for cancelling the maximization display.

Here, in the present embodiment, the displayed content in the 2D content area 154 is updated at the following three timings in principle. The first timing is a timing at which the application is activated. At this timing, the displayed content in each content is acquired from the server 101. In this case, for example, regarding the "new arrival" and the "my answer", data of 30 cases are acquired. The second timing is a timing at which screen scroll is performed so as to exceed the acquired data (here, data of 30 cases). The third timing is a timing at which the "refresh operation" described above is performed. In another embodiment, the timings for updating the 2D content area 154 are not limited thereto, and, for example, automatic update may be performed periodically. Update may be performed as appropriate according to the characteristics of the displayed content (for example, a certain content is updated in real time, and another content is manually updated).

Next, operation of the processing according to the present embodiment will be described in more detail with reference to FIGS. 19 to 25.

Figure 19:
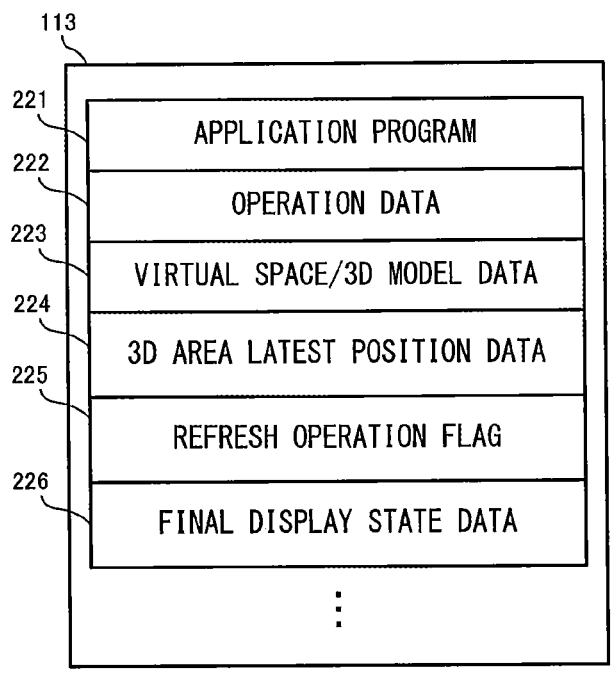
FIG. 19 is a non-limiting example of a program and information stored in a main memory 113 of the smart device 102.

FIG. 19 shows an example of a program and data stored in the main memory 113 of the smart device 102. In the main memory 113, an application program 221, operation data 222, virtual space/3D model data 223, 3D area latest position data 224, a refresh operation flag 225, and final display state data 226, etc. are stored.

The application program 221 is a program for executing the application according to the present embodiment. Specifically, the application program 221 is a program for executing processing in a flowchart of FIG. 20 described later.

The operation data 222 is data indicating the contents of various operations performed on the operation section 115. In the present embodiment, the operation data 222 includes data indicating presence/absence of an input to the touch panel as the operation section 115, a touch coordinate, and the like, and data indicating pressed states of various buttons that are not shown, and the like.

The virtual space/3D model data 223 is data for forming the virtual three-dimensional space that is to be projected to the 3D content area 153. The virtual space/3D model data 223 includes the 3D model of the above avatar, and the like.

The 3D area latest position data 224 is data that is used in the operation at the time of content switching as described above, and is data for indicating a latest displayed position of the 3D content area 153 within the screen (display range).

The refresh operation flag 225 is a flag for indicating whether the current state is a state where the above-described "refresh operation" is being performed.

The final display state data 226 is data for indicating, when display switching to each content is performed, a final display state (display range) of the content area 151 prior to the display switching. A final display state is stored per content.

Figure 20:
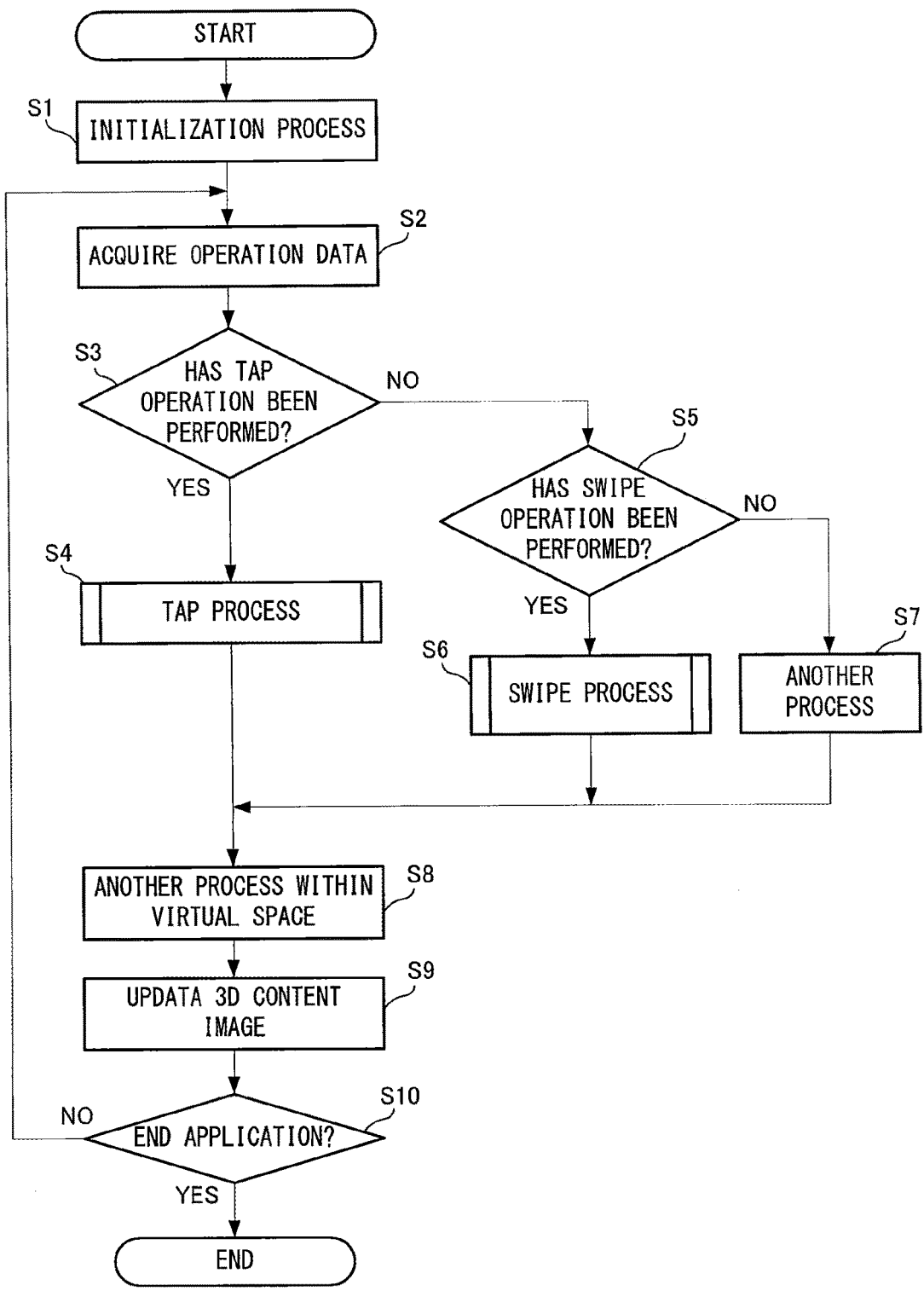
FIG. 20 is a flowchart showing details of application processing according to the embodiment.

Next, flow of processing executed by the processor section 111 of the smart device 102 will be described with reference to flowcharts of FIGS. 20 to 25. A processing loop of steps S2 to S10 in FIG. 20 is executed repeatedly, for example, every 60 frames.

First, when a command for activating the application according to the present embodiment is received, the processor section 111 executes an initialization process in step S1. Specifically, a process of initializing data used in this processing is executed. Furthermore, various objects such as the avatar object are generated on the basis of the virtual space/3D model data 223, and are positioned within the virtual three-dimensional space. In addition, the virtual camera is also positioned within the virtual three-dimensional space. Moreover, access to the server 101 is performed, and data for displaying the 2D content area 154 and the like is also acquired. Then, the processor section 111 projects an image obtained by capturing the virtual three-dimensional space with the virtual camera, to the 3D content area 153, and generates an image to be displayed in the 2D content area 154, on the basis of the data acquired from the server 101. Then, the processor section 111 displays the content area 151 including the 3D content area 153 and the 2D content area 154, on the screen. In the initial state, the "new arrival" content is displayed in the 2D content area 154.

Next, in step S2, the processor section 111 acquires the operation data 222. Subsequently, in step S3, on the basis of the operation data 222, the processor section 111 determines whether a tap operation has been performed. When a tap operation has not been performed (NO in step S3), the processing proceeds to step S5 described later. When a tap operation has been performed (YES in step S3), the processor section 111 subsequently executes a tap process in step S4.

Figure 21:
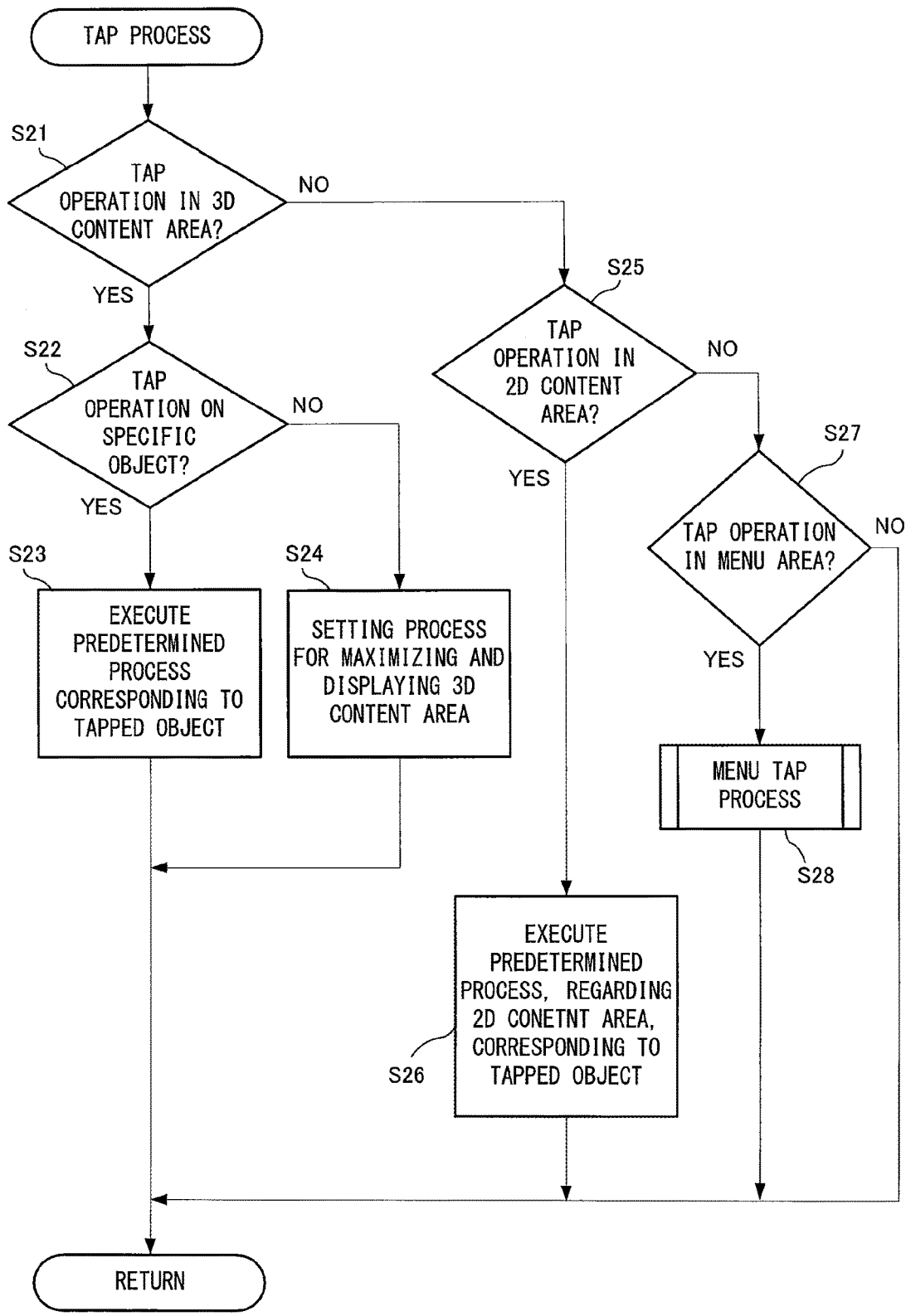
FIG. 21 is a flowchart showing details of a tap process in step S4.

FIG. 21 is a flowchart showing details of the tap process in step S4. First, in step S21, on the basis of the operation data 222, the processor section 111 determines whether a tap operation in the 3D content area 153 has been performed. When the tap operation is a tap operation in the 3D content area 153 (YES in step S21), the processor section 111 determines, in step S22, whether a tap operation on a predefined specific object (e.g., the object of the above-described "balloon", etc.) has been performed. As a result, when a tap operation on the specific object has been performed (YES in step S22), the processor section 111 executes a predetermined process corresponding to the tapped object in step S23.

On the other hand, when a tap operation on the specific object has not been performed (NO in step S22), the processor section 111 executes a setting process for maximizing and displaying the 3D content area 153, in step S24. Specifically, the processor section 111 changes the angle of view of the virtual camera. Since the virtual 3D space is displayed on the vertically-long screen when the maximization display is performed as shown in FIG. 9 described above, the aspect ratio of the screen changes. Thus, the angle of view of the virtual camera is changed according to this change. In this process, setting may be made such that zooming is performed together with changing the angle of view. For example, when the maximization display is performed, the avatar of the user may be zoomed at a predetermined scaling factor and displayed.

On the other hand, as a result of the determination in step S21, when the tap operation is not a tap operation in the 3D content area 153 (NO in step S21), the processor section 111 subsequently determines, in step S25, whether the tap operation is a tap operation in the 2D content area 154. As a result, when the tap operation is a tap operation in the 2D content area 154 (YES in step S25), the processor section 111 executes a predetermined process, regarding the 2D content area 154, corresponding to (an image at) the tap position, in step S26. In addition, in accordance with this process, the displayed content in the 2D content area 154 is also updated as appropriate.

On the other hand, as a result of the determination in step S25, when the tap operation is not a tap operation in the 2D content area 154 (NO in step S25), the processor section 111 determines, in step S27, whether the tap operation is a tap operation in the menu area 152. When the performed tap operation is a tap operation in the menu area 152 (YES in step S27), the processor section 111 executes a menu tap process in step S28. On the other hand, when the tap operation is not a tap operation in the menu area 152 (NO in step S27), the tap process ends.

Figure 22:
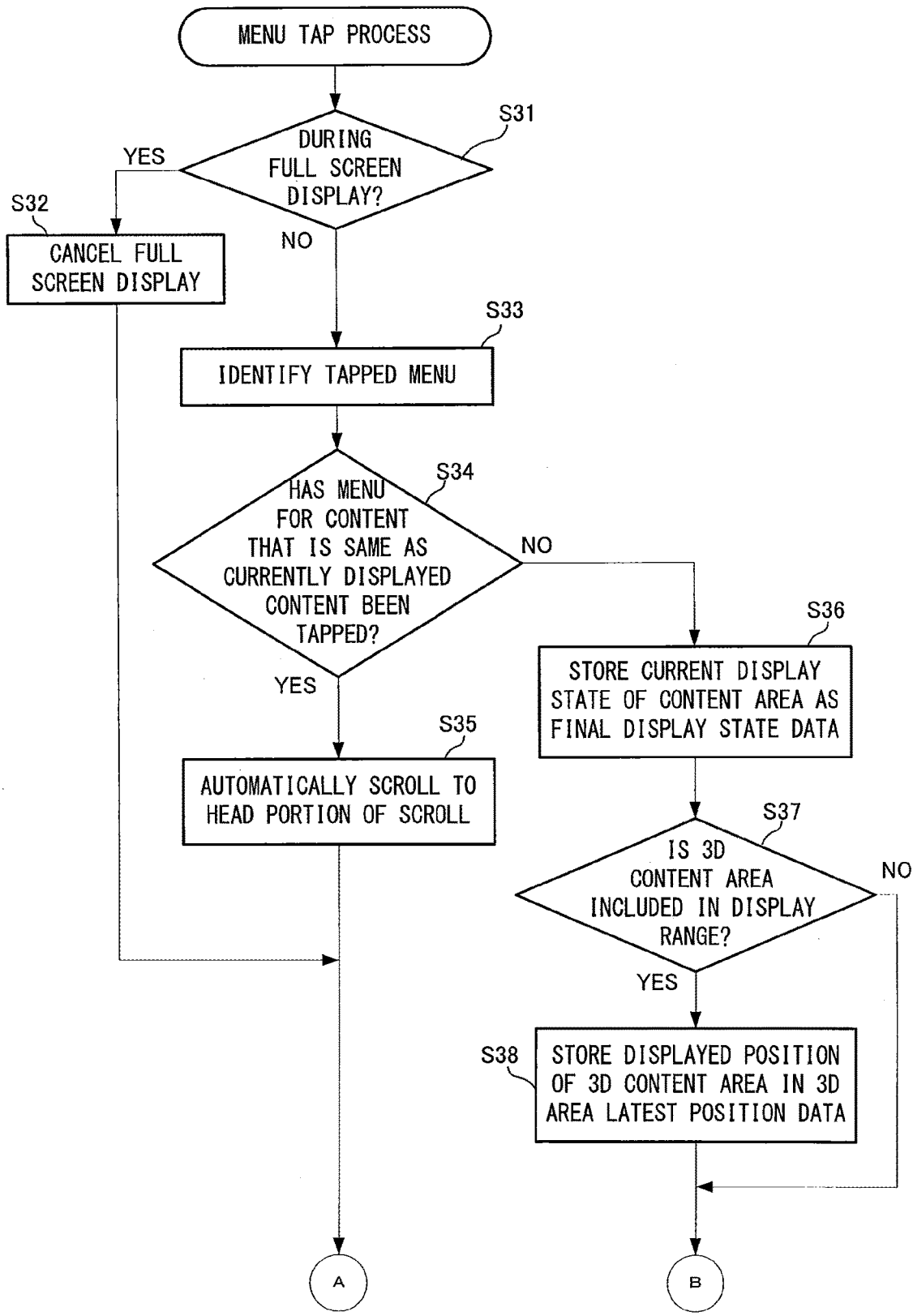
FIG. 22 is a flowchart showing details of a menu tap process in step S28.
Figure 23:
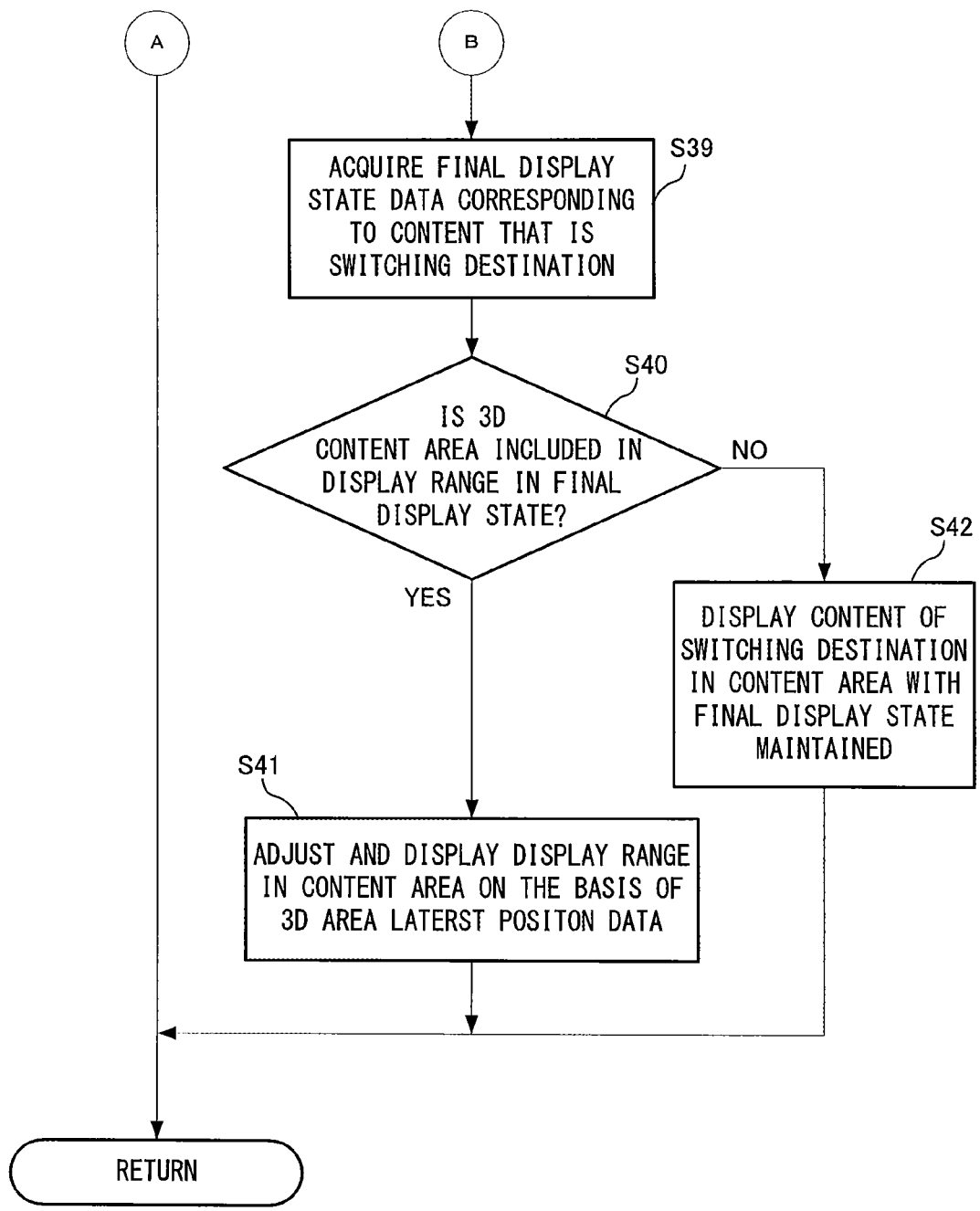
FIG. 23 is a flowchart showing details of the menu tap process in step S28.

FIG. 22 is a flowchart showing details of the menu tap process in step S28. First, in step S31, the processor section 111 determines whether the current state is a full screen display state of the 3D content area 153. As a result, when the current state is the full screen display state (YES in step S31), the processor section 111 performs a process of cancelling the full screen display, in step S32. Then, the menu tap process ends once.

On the other hand, as a result of the determination in step S31, when the current state is not during full screen display (NO in step S31), the processor section 111 identifies the tapped menu button 181 in step S33. Next, in step S34, the processor section 111 determines whether the menu button 181 for the content that is the same as the currently displayed content has been tapped. As a result, when the menu button 181 for the content that is the same as the currently displayed content has been tapped (YES in step S34), the processor section 111 automatically scrolls the content area 151 in step S35 until the display range reaches the upper edge (head) of the content area 151. The scroll speed at this time is preferably fast. In another embodiment, scroll may not be performed, and an upper edge portion of the content area 151 may be instantaneously displayed.

On the other hand, as a result of the determination in step S34, when the menu button 181 corresponding to a content different from the currently displayed content has been tapped (NO in step S34), the processor section 111 stores data indicating the display state (display range) of the currently displayed content area, as the final display state data 226 corresponding to this content, in the main memory 113 in step S36. Next, in step S37, the processor section 111 determines whether the 3D content area 153 is included in the display range of the currently displayed content area. As a result, when the 3D content area 153 is included (YES in step S37), the processor section 111 stores data indicating the displayed position of the 3D content area 153, as the 3D area latest position data 224, in the main memory 113 in step S38. On the other hand, when the 3D content area 153 is not included (NO in step S37), the process in step S38 is skipped.

Next, in step S39, the processor section 111 acquires the final display state data 226 corresponding to the content that is the switching destination (shift destination). Then, in step S40, on the basis of the acquired final display state data 226, the processor section 111 determines whether the 3D content area 153 is included in the display range in the final display state of the content that is the switching destination. As a result, when the 3D content area 153 is included (YES in step S40), the processor section 111 adjusts the display range of the content area for the switching destination, as appropriate, and displays the content area 151 corresponding to the content that is the switching destination, on the screen, on the basis of the 3D area latest position data 224 in step S41. On the other hand, when the 3D content area 153 is not included (NO in step S40), the processor section 111 displays the content area 151 regarding the content that is the switching destination, on the basis of the acquired final display state data 226 in step S42. That is, when only the 2D content area 154 has been displayed, the display in this state is restored. Then, the menu tap process ends.

Referring back to FIG. 20, the case where, as a result of the determination in step S3, a tap operation has not been performed (NO in step S3) will be described. In this case, in step S5, the processor section 111 determines whether a swipe operation has been performed. Here, the swipe operation to be determined includes both a state where a swipe operation is being performed (a state where touch-on continues) and a state immediately after a swipe operation ends (a state immediately after touch-off is performed after a swipe operation is performed).

As a result of the determination in step S5, when a swipe operation has been performed (YES in step S5), the processor section 111 executes a swipe process in step S6. On the other hand, when a swipe operation has not been performed (NO in step S5), the processor section 111 executes another process based on the operation data 222 in step S7. Thereafter, the processor section 111 proceeds to a process in step S8 described later.

Figure 24:
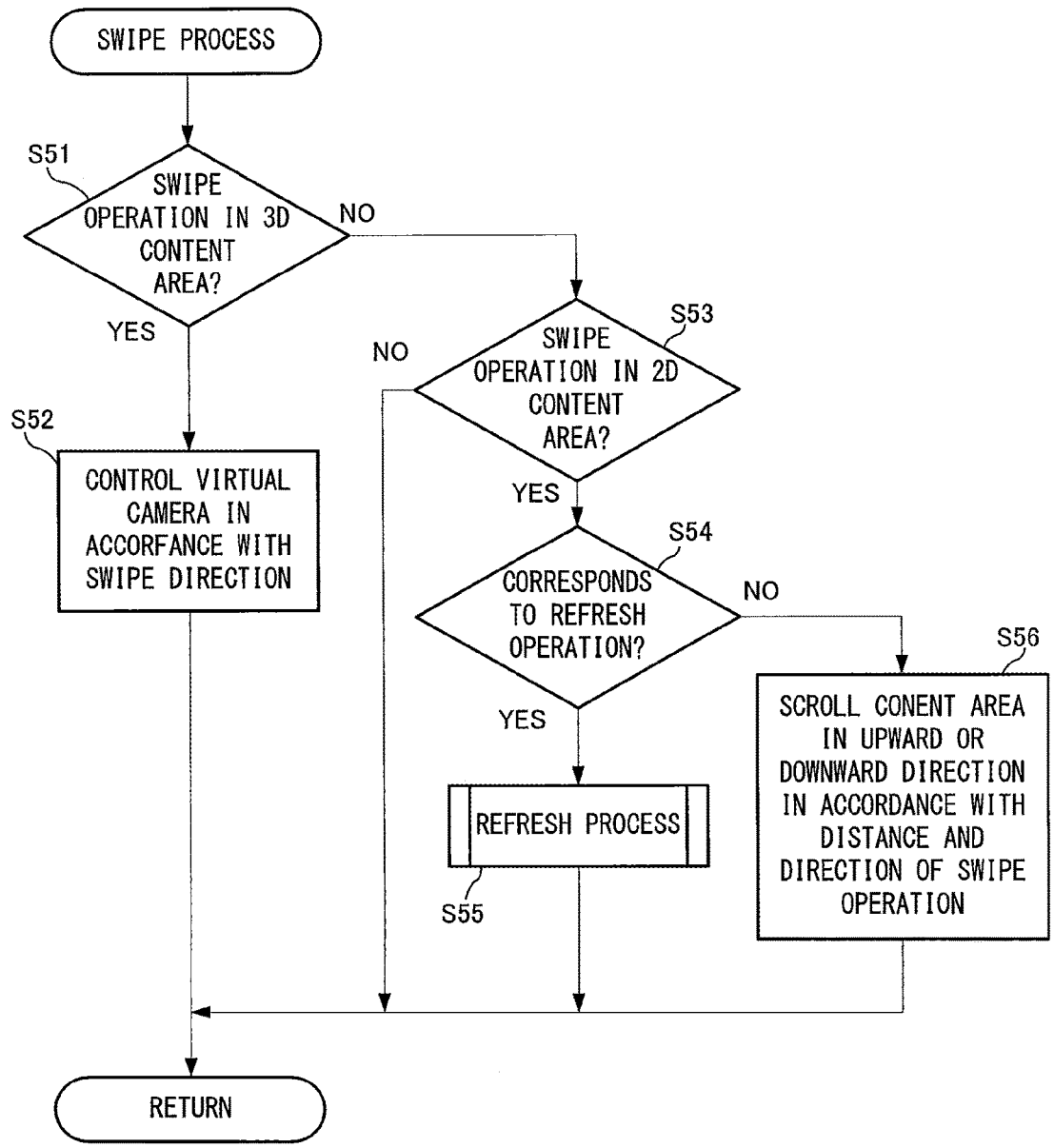
FIG. 24 is a flowchart showing details of a swipe process in step S6.

FIG. 24 is a flowchart showing details of the swipe process in step S6. First, in step S51, the processor section 111 determines whether a swipe operation in the 3D content area 153 has been performed. As a result, when a swipe operation in the 3D content area 153 has been performed (YES in step S51), the processor section 111 controls the position and the attitude of the virtual camera within the virtual space on the basis of the direction and the distance of the swipe operation in step S52. On the other hand, when the swipe operation is not a swipe operation in the 3D content area 153 (NO in step S51), the processor section 111 determines, in step S53, whether a swipe operation in the 2D content area 154 has been performed. When the swipe operation is not a swipe operation in the 2D content area 154 (NO in step S53), the swipe process ends. On the other hand, when a swipe operation in the 2D content area 154 has been performed (YES in step S53), the processor section 111 subsequently determines, in step S54, whether the swipe operation corresponds to the above-described "refresh operation". Specifically, the processor section 111 determines whether a swipe operation in the downward direction has been performed in a state where the upper edge of the content area 151 (the entire 3D content area 153) is displayed. As a result of the determination, when the swipe operation does not correspond to the "refresh operation" (NO in step S54), the processor section 111 executes a process of scrolling in any of the upward and downward directions of the content area in accordance with the distance and the direction of the swipe operation in step S56. On the other hand, when the swipe operation corresponds to the "refresh operation" (YES in step S54), the processor section 111 executes a refresh process in step S55.

Figure 25:
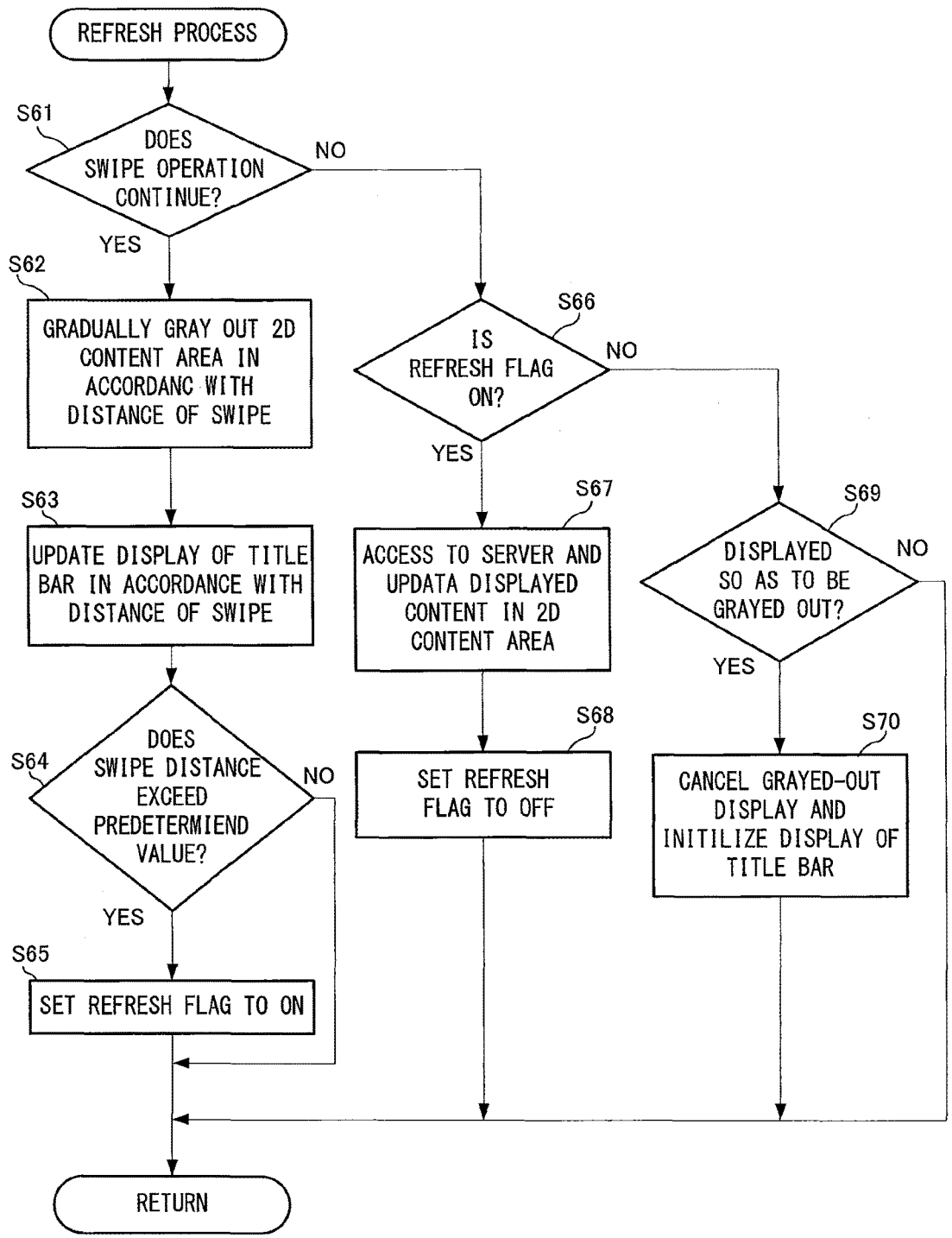
FIG. 25 is a flowchart showing details of a refresh process in step S55.

FIG. 25 is a flowchart showing details of the refresh process. First, in step S61, the processor section 111 determines whether the current state is a state where the swipe operation continues, that is, whether the current state is a state where a touch input is currently being detected or a state immediately after touch-off. As a result, when the current state is a state where the swipe operation continues (YES in step S61), the processor section 111 performs, in step S62, display in which the 2D content area 154 (except for the title bar 155 portion) is gradually grayed out in accordance with the distance of the swipe operation. Furthermore, in step S63, the processor section 111 executes a process of changing/updating the displayed content in the title bar 155 in accordance with the distance of the swipe operation. For example, a text such as "Update when dragged downward" is displayed, or display is performed in which the gauge is extended horizontally as shown in FIGS. 11 and 12.

Next, in step S64, the processor section 111 determines whether the distance of the swipe operation exceeds a predetermined value that is predefined. As a result, when the distance of the swipe operation exceeds the predetermined value (YES in step S64), the processor section 111 sets the refresh operation flag 225 to ON in step S65. On the other hand, when the distance of the swipe operation does not exceed the predetermined value (NO in step S64), the process in step S65 is skipped. This is performed for preventing the 2D content area from being refreshed even if touch-off is performed when the distance of the swipe operation is not a sufficient length.

Next, as a result of the determination in step S61, when the current state is a state where the swipe operation does not continue, that is, a state immediately after the swipe operation is performed and then touch-off is performed (NO in step S61), the processor section 111 determines, in step S66, whether the refresh operation flag 225 is ON. As a result, when the refresh operation flag 225 is ON (YES in step S66), the processor section 111 requests the latest data of the content to be displayed on the 2D content area 154, from the server 101 in step S67. Then, the processor section 111 downloads the data corresponding to the request, from the server 101. Then, the processor section 111 updates the displayed content in the 2D content area 154 on the basis of the downloaded data. Thereafter, in step S68, the processor section 111 sets the refresh operation flag 225 to OFF.

On the other hand, as a result of the determination in step S66, when the refresh operation flag 225 is OFF (NO in step S66), this corresponds to a case where the refresh operation is cancelled in the middle due to the swipe distance being short, etc. In this case, in step S69, the processor section 111 determines whether the 2D content area 154 is displayed so as to be grayed out. As a result, when the 2D content area 154 is displayed so as to be grayed out (YES in step S69), the processor section 111 performs a process of cancelling the grayed-out display in step S70. In addition, when the display of the title bar 155 has been changed, the processor section 111 also performs a process of returning the display of the title bar 155 to the initial state. On the other hand, when the 2D content area 154 is not displayed so as to be grayed out (NO in step S69), the process in step S70 is skipped. Then, the refresh process ends.

Referring back to FIG. 20, when any one of the tap process in step S4, the swipe process in step S6, and the other process in step S7 ends, the processor section 111 subsequently executes, in step S8, a predetermined process within the virtual three-dimensional space other than the above process. That is, the state of the virtual three-dimensional space is updated regardless of presence/absence of an operation of the user. In this process, for example, the processor section 111 inquires of the server 101 as to presence/absence of a new arrival reply content. When a new arrival reply content is present, the processor section 111 executes a process for generating a balloon object as described above and displaying the balloon object as a virtual three-dimensional space image. In addition, a process of controlling motion of the object within the virtual space, etc. is also executed. For example, a process of voluntarily moving the avatar object of the user, etc. (for example, the avatar object walks around in a room) is executed. Then, in step S9, the processor section 111 generates a three-dimensional image by capturing, with the virtual camera, the virtual three-dimensional space in which the process in step S8 is reflected, and projects this image to the 3D content area 153. That is, the image displayed in the 3D content area 153 is updated. This process is performed every frame. Thus, even when the 3D content area 153 is not included in the display range (i.e., in a state where a virtual three-dimensional image is not displayed), the state of the virtual three-dimensional space (the image projected to the 3D content area 153) is continuously updated. As a matter of course, even during a screen scroll operation, the state of the virtual three-dimensional space is continuously updated.

Next, in step S10, the processor section 111 determines whether a condition for ending the application is satisfied. When the condition is satisfied (YES in step S10), the processor section 111 ends the application. When the condition is not satisfied (NO in step S10), the processor section 111 returns to step S2 and repeats the above processes. This is the end of the detailed description of the application processing according to the present embodiment.

As described above, in the present embodiment, control is performed in which both the 3D content area 153 and the 2D content area 154 displayed on the single screen are scrolled together. Thus, the limited size of the screen can be effectively used in accordance with the degree of interest of the user in each of the 3D content area 153 and the 2D content area 154, thereby enhancing the convenience of the user. In addition, in the case where a plurality of contents are provided, even when switching of the screen is performed, the display does not return to the initial state at each time of switching (e.g., the head portion of the content is not displayed at each time of switching), so that the convenience of the user can be enhanced.

The case of vertical scroll in the vertical screen has been described above, but application to the case of using horizontal scroll in a horizontal screen is possible. For example, the content area 151 may be configured such that the 3D content area 153 is positioned at the left edge of the content area 151 and the 2D content area 154 is positioned to the right of the 3D content area 153.

In another embodiment, when a plurality of contents are switched, scroll control corresponding to the content in each content may be performed. For example, when a content A is displayed, control may be performed in which the 3D content area 153 and the 2D content area 154 are scrolled together as described above; and in the case of a content B, control may be performed in which the displayed position of the 3D content area 153 is fixed and only the 2D content area 154 is scrolled.

In the embodiment described above, the series of processes of the application as described above is performed in the single smart device 102. In another embodiment, the series of processes described above may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses.

While the exemplary embodiments have been described in detail, the foregoing description is in all aspects illustrative and not restrictive. It is understood that numerous other modifications and variations can be devised without departing from the scope of the exemplary embodiments.

(Appended Notes)

It is possible to extract the following configurations from the specific embodiments described above.

(Appended Note 1)

A computer-readable non-transitory storage medium having stored therein an information processing program executed by a computer of an information processing apparatus capable of receiving an operation input performed with a pointing device, the information processing program causing the computer to execute:

displaying a list including a plurality of items on a display device;

displaying the plurality of items on the display device such that the plurality of items are gradually changed to the same color in accordance with an operation input continuously performed with the pointing device; and updating the list and displaying the list on the display device when a break in the operation input continuously performed with the pointing device is detected.

(Appended Note 2)

The computer-readable non-transitory storage medium according to Appended Note 1, wherein the information processing program further causes the computer to execute scrolling the list, and a direction of the operation input continuously performed with the pointing device is the same as a direction of the scrolling.

(Appended Note 3)

The computer-readable non-transitory storage medium according to Appended Note 1 or 2, wherein the information processing program further causes the computer to execute displaying an object having a length which changes in accordance with an operation input continuously performed with the pointing device, on the display device together with the displaying the plurality of items on the display device.

(Appended Note 4)

The computer-readable non-transitory storage medium according to Appended Note 3, wherein the object is displayed such that the length thereof changes in a direction orthogonal to a direction of the operation input continuously performed with the pointing device.

(Appended Note 5)

The computer-readable non-transitory storage medium according to any one of Appended Notes 1 to 4, wherein after the plurality of items are changed to the same color, when a break in the operation input continuously performed with the pointing device is detected, the list is updated.

What is claimed is:

1. A computer-readable non-transitory storage medium having stored therein an information processing program executed by a computer of an information processing apparatus capable of receiving an input performed with a pointing device, the information processing program causing the computer to execute:

positioning an object in a virtual three-dimensional space;

positioning a virtual camera in the virtual three-dimensional space;

generating a first image by capturing the virtual three-dimensional space with the virtual camera;

generating a second image;

displaying, on a screen, a content display area including a three-dimensional image area that includes the first image and a two-dimensional image area that includes the second image, the two-dimensional image area being adjacent to the three-dimensional image area, wherein the first and second images are concurrently displayed on the screen;

determining whether an input performed with the pointing device is located within the three-dimensional image area or the two-dimensional image area;

based on determination that the input is located within the two-dimensional image area, performing a screen scroll of the content display area;

based on determination that the input is located within the three-dimensional image area, maintaining the content display area without scrolling; and control the virtual three-dimensional space regardless of whether an operation for the screen scroll is being performed, wherein both the three-dimensional image area and the two-dimensional image area are scrolled on the screen together when the content display area is scrolled.

2. The computer-readable non-transitory storage medium according to claim 1, wherein the information processing program further causes the computer to execute controlling the virtual three-dimensional space without scrolling the content display area on the screen when a predetermined operation having a starting point of an input at a position within the three-dimensional image area has been performed.

3. The computer-readable non-transitory storage medium according to claim 1, wherein the information processing program further causes the computer to execute enlarging a size of the three-dimensional image area when a first operation has been performed with respect to the three-dimensional image area with the pointing device.

4. The computer-readable non-transitory storage medium according to claim 3, wherein an angle of view of the virtual camera is changed on the basis of an aspect ratio of the three-dimensional image area after the enlargement of the size of the three-dimensional image area.

5. The computer-readable non-transitory storage medium according to claim 3, wherein the information processing program further causes the computer to execute performing control of moving the virtual camera in accordance with a content of a second operation different from the first operation when the second operation has been performed with respect to the three-dimensional image area with the pointing device.

6. The computer-readable non-transitory storage medium according to claim 1, wherein
the information processing program further causes the computer to execute updating a content displayed in the two-dimensional image area, in accordance with a predetermined operation performed with the pointing device, and
the first image included with the three-dimensional image area is updated at a predetermined time interval regardless of presence/absence of the predetermined operation performed with the pointing device.

7. The computer-readable non-transitory storage medium according to claim 1, wherein the three-dimensional image area is positioned in the content display area and at a position corresponding to a head of scroll when the screen scroll is performed.

8. The computer-readable non-transitory storage medium according to claim 1, wherein the three-dimensional image area and the two-dimensional image area are positioned such that a direction in which the three-dimensional image area and the two-dimensional image area are adjacent to each other is parallel to a direction of the screen scroll.

9. The computer-readable non-transitory storage medium according to claim 1, wherein the first image of the three-dimensional image area is updated even when the three-dimensional image area is not displayed on the screen.

10. The computer-readable non-transitory storage medium according to claim 1, wherein
a plurality of contents are displayed in the content display area,
the information processing program further causes the computer to execute switching display of the plurality of contents in accordance with an input performed with the pointing device, and
only a displayed content in the two-dimensional image area is changed in accordance with a content switching operation, further when switching of a content occurs, information indicating a display range of the content display area on the screen immediately before the switching is stored, and then when switching to content is performed in a state where another content is displayed, the display is switched so as to reproduce the stored display range.

11. The computer-readable non-transitory storage medium according to claim 10, wherein
when the switching of the content occurs, it is determined whether at least a part of the three-dimensional image area is included in a display screen immediately before the switching, and
when switching from a first content to a second content occurs, if the three-dimensional image area is included both in a display range, on the screen, of the content display area regarding the first content and in a final display range of the content display area regarding the second content, a display range of the content display area regarding the second content is adjusted and the switching is performed, such that a displayed position of the three-dimensional image area regarding the first content before the switching is reflected as a displayed position of the three-dimensional image area regarding the second content after the switching.

12. An information processing system capable of receiving an input performed with an input device, the information processing system including a processor configured to:
position an object in a virtual three-dimensional space;
position a virtual camera in the virtual three-dimensional space;
generate a first by capturing the virtual three-dimensional space with the virtual camera;
generate a second image image;
display, on a screen, a content display area including a three-dimensional image area that includes the first image and a two-dimensional image area that includes the second image, the two-dimensional image area being adjacent to the three-dimensional image area, wherein the first and second images are concurrently displayed on the screen;
determine whether an input provided via the input device performed with the pointing device is located within the three-dimensional image area or the two-dimensional image area;
based on determination that the input is located within the two-dimensional image area, perform a screen scroll of the content display area;
based on determination that the input is located within the three-dimensional image area, maintain the content display area without scrolling; and
update a content displayed in the two-dimensional image area, in accordance with a predetermined operation performed with the pointing device,
wherein both the three-dimensional image area and the two-dimensional image area are scrolled on the screen together when the content display area is scrolled,
wherein the first image included with the three-dimensional image area is updated at a predetermined time interval regardless of presence/absence of the predetermined operation performed with the pointing device.

13. An information processing method for controlling a computer of an information processing apparatus capable of receiving an input performed with a user input device, the information processing method comprising:
positioning an object in a virtual three-dimensional space;
positioning a virtual camera in the virtual three-dimensional space;
generating a first image by capturing the virtual three-dimensional space with the virtual camera;
generating a second image;
displaying, on a screen, a content display area including a three-dimensional image area for displaying the first image and a two-dimensional image area for displaying the second image, the two-dimensional image area being adjacent to the three-dimensional image area, wherein the first and second images are concurrently displayed on the screen;
determining whether an input performed with the user input device, is located within the three-dimensional image area or the two-dimensional image area;
based on determination that the input is located within the two-dimensional image area, performing a screen scroll of the content display area;
based on determination that the input is located within the three-dimensional image area, maintaining the content display area without scrolling; and
controlling the virtual three-dimensional space regardless of whether an operation for the screen scroll is being performed, wherein both the three-dimensional image area and the two-dimensional image area are scrolled on the screen together when the content display area is scrolled.

\* \* \* \* \*